April 21, 1964     G. TREPAUD     3,129,697
HEAT EXCHANGER AND BOILER, PARTICULARLY TO USE THE
HEAT GIVEN OFF BY NUCLEAR REACTORS
Filed Jan. 12, 1960     6 Sheets-Sheet 1

April 21, 1964 G. TREPAUD 3,129,697
HEAT EXCHANGER AND BOILER, PARTICULARLY TO USE THE
HEAT GIVEN OFF BY NUCLEAR REACTORS
Filed Jan. 12, 1960 6 Sheets-Sheet 5

United States Patent Office 3,129,697
Patented Apr. 21, 1964

3,129,697
HEAT EXCHANGER AND BOILER, PARTICU-
LARLY TO USE THE HEAT GIVEN OFF BY
NUCLEAR REACTORS
Georges Trepaud, 17 Rue Legendre, Paris, France
Filed Jan. 12, 1960, Ser. No. 5,564
Claims priority, application France Jan. 14, 1959
12 Claims. (Cl. 122—34)

The present invention relates to a heat exchanger provided with a tubular nest and to a boiler equipped with said exchanger and intended to use the heat given off by an outer source, particularly by a nuclear reactor.

The heat exchanger according to the present invention is intended to allow heat exchanges, producing or not state changes between two fluids in any physical state but being, the one subjected to a pressure well above atmospheric pressure (for instance, a few hundreds of atmospheres) and the other subjected to a pressure strongly below said pressure (for instance, a few ten's of atmospheres).

Heat exchangers of this type are required not only to use nuclear energy but also in the chemical industry (synthesis of ammonia, liquefactions, for instance of methane, and the like).

Heat exchangers provided with a tubular nest are already known in which the fluid under a low pressure flows inside the tubes of the nest, whereas the fluid under a high pressure circulates around these tubes, inside an envelope. The thickness of the wall of this envelope must thereby be the greater as the pressure of the fluid applied on its inner face differs more from the atmospheric pressure applied on its outer face and the diameter of said envelope and also of the nest and its total exchange surface are greater. These envelopes in the known exchangers have such thicknesses that they must be cast and their weight and their cost prices are absolutely prohibitive.

Other exchangers provided with a tubular nest have also been designed, in which the fluid under a high pressure flows in the tubes of the nest, whereas the fluid under a low pressure circulates inside the envelope: this envelope in such a case, can have walls of a relatively low thickness, made with bent sheets: nevertheless, the distribution chambers for the fluid under a high pressure, in which open the tubes of the nest, must have walls thick enough to stand the high inner overpressure as, in these known exchangers, the nest occupies entirely the inner volume of the generally cylindrical envelope, the distribution chambers being provided in the bottoms, also cylindrical, of the envelope, the thickness of the walls of these chambers is to be the greater as their "bearing" is always important, at least equal to the diameter of the tubular nest. The distribution chambers, in the known exchangers of this type, are therefore usually delimited by molded plates or half spherical bottoms, having thicknesses of several tens of centimeters, having thereby prohibitive weights and cost prices and must be assembled with members, such as bolts of corresponding sizes.

The heat exchanger according to the present invention is of the type above described but offers none of the drawbacks of the known exchangers of the same type. It is characterized by the fact that the tubes of its nest in the inner channels of which circulates the fluid under a high pressure, are arranged in a closed annular chamber, the side walls of which are formed by rather thin, concentric envelopes inside which the fluid under a low pressure circulates between the tubes of the nest and the ends of the inner channels of said tubes open in distribution chambers intended for the fluid under high pressure which are also annular: the walls of said chambers, subjected to the high pressure of the fluid, have bearings which are at the most equal to the radial width of the annular nest and thereby have relatively small thicknesses.

The boiler according to the present invention belongs to the type in which a fluid under a high pressure, heavy water or carbonic gas for instance, circulating in closed circuit, brings the heat given out by an outer source of heat, eventually a nuclear source.

The most important conditions to be fulfilled by boilers designed for this use are as follows:

(1) Since the fluid under pressure possesses a strong radioactive contamination acquired when passing through the nuclear reactor, the circuit for this fluid in the boiler must not allow any exchange other than heat exchange between this poisoned fluid and the liquid to be vaporized and also its vapor: particularly, the poisoning fluid must flow at a uniform and rather fast speed in all its circuit inside the boiler and must never accumulate in pockets nor even undergo important decreases of speed, which would result for instance from sudden changes in the section of the tubes. Any escape of the poisoning fluid must be very quickly observed and throttled and the entire fluid thus escaped must be recovered without any possible contamination of the liquid, which is to be vaporized or of its vapor.

(2) The particular conditions concerning the working of nuclear sources require a perfect resistance to strong heat impacts: at the starting and also in case of a sudden stop of the reactor, the temperature of the fluid under a high pressure undergoes an important and very fast change, which imparts to the exchanger of the boiler strong mechanical stresses, particularly at the level of the joints, which are made for instance by expansion, welding, etc., the good standing of which is of capital importance to secure the tightness of the circuit of the poisoning fluid. The same difficultities occur when a disturbance in the working of the nuclear reactor requires a sudden stopping of the working and of the circulation in the boiler of the fluid under a high pressure.

(3) The vapor produced by the boiler, which generally is steam must be sufficiently dry to feed directly turbines, which are, for instance, connected with electric current generators.

(4) In the special case, very interesting in practice, when the fluid transporting the heat given out by the nuclear reactor is heavy water under a high pressure, the very high cost price of this fluid imposes absolutely draconian supplementary conditions: on the one hand, the total volume of the heavy water contained in the boiler, under normal running conditions, must be as small as possible; on the other hand, the heavy water being so expensive, it becomes even more necessary to be able to observe and throttle very rapidly any leakage of this liquid and to recover totally the escaped heavy water without leaving to it the possibility of mixing with plain water from which it would be later on be very costly to separate it.

Oppositely, the use of heavy water as a heating fluid brings about an important advantage, when compared to the use of a gas. As the thermic conductivity of heavy water is much greater than the conductivity of a gas, even under a high pressure, the heat exchange through the walls of the evaporator in the boiler with the liquid which is to be vaporized, is much more active.

None of the boilers known up to now, even when specially designed to be fed with a nuclear source, fulfills satisfactorily the principal conditions above mentioned.

On the contrary, the boiler according to the invention, fulfils all of these conditions and, in addition, offers other advantages, which are mentioned later on.

The boiler is characterized by the two following devices, preferably applied in combination:

(a) Its evaporator is provided with a heat exchanger according to the present invention, in which the annular chamber, into which is vertically disposed the tubular nest and the central column formed by the outer envelope of said annular chamber communicate at their bases, known means keeping up in the central column the liquid to be vaporized at a preferably constant level and the mixture of liquid and vapor, when reaching the top of the annular chamber, passing therefrom into a separator, which sends back the liquid in the central column, preferably at its upper end.

(b) The tubes of the nest of the evaporator have double walls, so that their inner channels, in which circulates the fluid under a high pressure, have an annular shaped section, the liquid intended to be vaporized circulating simultaneously in two independent exchange circuits, the one constituted by the intervals between said tubes inside the annular chamber into which they are arranged and the other by the central channels of these double walled tubes.

Thanks to these new arrangements, the heat exchange between the fluid under a high pressure circulating in the annular channel of each double walled tube and the liquid to be vaporized, takes place through two walls, thereby strongly increasing their activity as in addition it is possible, by sufficiently reducing the radial width of said annular passage, to obtain for the heat transporting fluid a high circulation speed and to profit by an "equivalent hydraulic diameter" of the double walled tubes, which is notably smaller than the inner diameter of the smallest single walled tubes used in the known evaporators; this advantage is particularly valuable when the fluid under high pressure is heavy water having a great heat conductivity, as the superficial transmission coefficient reaches in such a case very high values; in the case of this very expensive fluid, this arrangement brings about the additional advantage of strongly reducing the total volume of fluid under a high pressure contained in the normal running state in the evaporator.

In addition, the use of double walled tubes, the annular channels of which have a comparatively small and uniform section, provides an even flow of the eventually poisoning fluid. With equal flue surfaces and equal passage sections for the liquid to be vaporized, it is also possible to dispose the nest of double walled tubes in a closed cylindrical envelope having a diameter smaller than the diameter of a known evaporator equipped with single walled tubes.

Although the boiler according to the invention has been specially designed to equip a machine intended to use the heat given out by nuclear reactors, it can be advantageously used, without departing from the scope of the present invention, to vaporize all sorts of liquids having very different vaporization temperatures: for instance, it can be used in a freezing apparatus, to vaporize ammonia or Freon by heat exchange with an unfreezable liquid such as brine or gas under a high pressure.

The perfect resistance to strong heat impacts of the entire boiler and particularly of the joints of the double walled tubes with the rigid plates obturating the ends of the envelope of the evaporator is secured thanks to the fact that the upper part of the outer envelope of the annular chamber of the nest is connected with the annular member forming the outer side wall of the upper distribution chamber of the fluid under a high pressure by means of a metallic sleeve or a metallic expansion chamber or that it externally surrounds said annular member to provide round it an annular chamber connecting said annular chamber of the nest with the separation chamber and crossed through by radial, elastically distortable ducts such as bellows tubes, connecting said upper distribution chamber with its manifold.

To observe and eventually recover the escape of the fluid under a high pressure, particularly when this liquid is costly and/or radioactively poisoning, the wall of each hole in the annular plates delimiting the distribution chambers of said fluid, in which the end of one of the tubes of the bundle is tightly set—for instance, by expansion or welding—has an annular by-pass connected with the outside by a channel, which can be the same for several adjoining tubes, each of said annular plates being for instance made of two half-plates tightened against each other, whereas said annular by-pass and the corresponding channel are, for instance, constituted by grooves provided on one at least of the facing faces of said half plates, on the rim of the hole for the passage of the tube.

By way of example, several embodiments of the heat exchanger and the boiler according to the invention are described hereafter and schematically illustrated in the annexed drawing, wherein.

Figure 1:
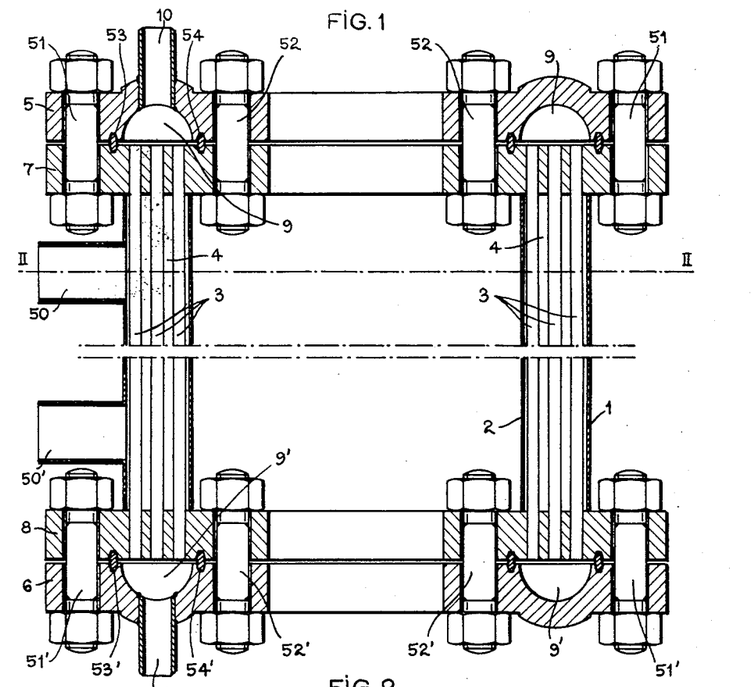
FIGURES 1 and 2 illustrate respectively in axial and in cross section along the line II—II, a heat exchanger provided with an annular nest of single walled tubes.
Figure 2:
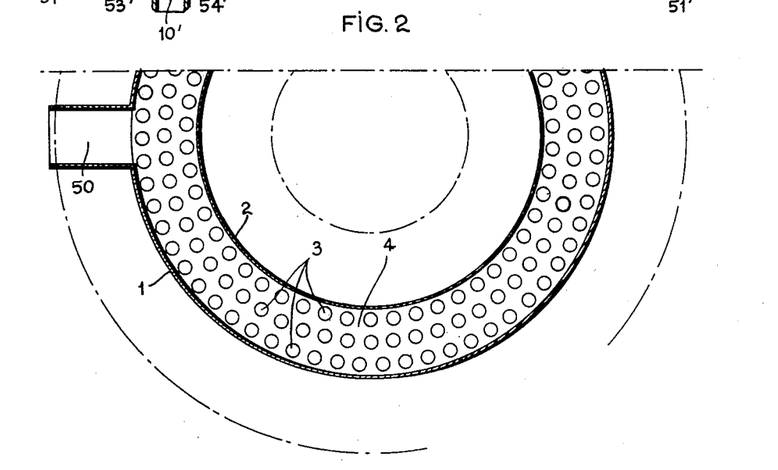

The heat exchanger illustrated in FIGURES 1 and 2 is essentially constituted by two metallic envelopes, cylindrical, co-axial 1, 2, having different diameters and made for instance of thin sheet iron. These two coaxial envelopes constitute the side walls of an annular chamber 4 in the upper and lower, respectively, ends of which open pipes 50, 50'. In the annular chamber 4 are regularly disposed tubes 3, which constitute an annular nest. The upper and lower, respectively, ends of the chamber 4 are tightly closed by thick annular metallic plates, 7, 8, to which are, for instance, welded the corresponding rims of the metallic envelopes 1 and 2. In the annular plates 7, 8, are bored holes in which the homologous ends of the tubes 3 of the nest are tightly set, for instance, by expansion or welding; annular metallic plates 5, 6, having the same inner and outer diameters as the annular plates 7, 8, are outwardly fixed on these plates by means of two circular peripheral rows of bolts, an outer row 51, 51', and an inner row 52, 52'. Preferably, the bolts pass through both plates 5 and 7 or 6 and 8. In each of the annular plates 5 and 6, in its downwardly facing face 7 or 8, between the two rows of outer bolts 51, 51', and inner bolts, 52, 52', above the ends of the inner channels of the tubes 3, is provided an annular recess, 9 or 9', which, in the embodiment shown, has a semi-circular section; a pipe 10 or 10', enters the face of each of the annular plates 5, 6, opposed to the plate 7 or 8 and opens in the corresponding annular recess 9 or 9': toroidal tightening joints 53 or 53' and 54 or 54', engage annular grooves provided in the facing faces of the plates 5 and 7 or 6 and 8, on both sides or the annular recess 9 or 9', to undergo, when the bolts 51, 51', 52, 52', are tightened, a sufficient crushing to secure the isolation of the recesses 9 and 9', with regard to the outer atmosphere.

The mode of use of the heat exchanger above described is as follows: the fluid under a low pressure is sent into the annular chamber 4 through one of the pipes 50, 50' and after circulating in the intervals between the tubes 3 of the nest, is discharged through the other pipe; the fluid under a high pressure is sent, through the pipe 10 or 10', into one of the two annular recesses 9 or 9' of the plates 5 or 6, which constitute the distribution chambers of said fluid under a high pressure. This fluid passes from the starting distribution chamber 9 or 9' into the open ends of the inner channels of the tubes 3 which open in the recess: after flowing in the tubes 3, the fluid under a high pressure is collected in the other starting distribution chamber 9' or 9, from where it is discharged through the corresponding pipe 10' or 10. Of course, the two fluids can flow, the one into the inner channels of the tubes 3 and the other into the annular chamber 4, either in the same sense, either in opposed senses, that is to say in counter-flow. On the other hand, when the heat exchange is not followed by a change in state of one of the two fluids, the position of the axis of the exchanger with regard to the ground can be any one: the vertical position illustrated in the drawing is required only in the case of an evaporator in which the liquid under a low pressure is introduced at the lower part of the annular chamber 4, through the pipe 50', the mixture of liquid and vapor being collected at the upper part of said annular chamber 4 through the upper pipe 50.

The thick annular plates 5, 6, 7, 8, which delimit the distribution chambers 9, 9', of the fluid under a high pressure must have a sufficient thickness to support the inner overpressures existing in these chambers. On the contrary, the metallic envelopes 1, 2, of the annular chamber in which flows the fluid under a low pressure, can have relatively much smaller thicknesses as they have to support only the small pressure difference applied on their two faces. The sizes and number of the tightening bolts 51, 51', 52, 52', are also selected to secure an adequate tightening of these annular plates against each other so that the tightening of the distribution chambers 9, 9', may be perfect.

In addition, known means are provided to slow down the flow of the fluid under low pressure in the annular chamber 4 and preferably to impart a helical motion to said flow. These means are, for instance, suitable baffles.

To emphasize the advantage obtained, according to the present invention, by disposing the tubular nest 3 in an annular chamber 4, the thicknesses of the annular plates 5, 6, 7, 8 of the form of the invention illustrated in FIGURES 1 and 2, in which the diameter of the outer envelope 1 is about six times larger than the radial width of the annular chamber, will be compared with the thicknesses required for the plates delimiting the distribution chambers of the fluid under high pressure in the case of a heat exchanger of a known type, with a cylindrical tubular nest having the same total exchange surface. Assuming that this cylindrical nest is constructed with the same number of tubes, of the same diameters and separated by the same intervals from each other as the annular nest 3, a simple calculation shows that the outer envelope of the exchanger provided with a cylindrical nest must have a diameter close to only ¾ of the diameter of the outer envelope 1 of the exchanger provided with an annular nest. On the other hand, the plates delimiting the distribution chambers of said exchanger having a cylindrical nest, said plates being also cylindrical, have to support the high pressure of the fluid on a bearing which is close to the diameter of the cylindrical nest, itself close to ¾×6=4.5 times the radial width of the annular nest; to draw a conclusion, the walls of the cylindrical distribution chambers of the exchanger provided with a cylindrical nest have to stand the high pressure of the fluid on bearings which are about 4.5 times greater than the bearings of the wall of the annular distribution chambers of the heat exchanger according to the present invention, having the same total surface: other things being equal, the walls of the distribution chambers of the two compared exchangers have thicknesses which are also in the ratio 4.5 Of course, the weights of the members delimiting these distribution chambers are in the same ratio 4.5. On the other hand, since the jointing bolts of the various members delimiting the distribution chambers of the fluid under a high pressure are in two circular rows respectively disposed on the inner periphery (bolts 52 and 52') and the outer periphery (bolts 51 and 51') of the annular plates 5, 6, 7, 8, of the exchanger according to the invention, whereas in the known exchanger with a cylindrical nest, these jointing bolts are arranged in a single circular row, the diameter of which is slightly greater than the diameter of said cylindrical nest and thereby generally smaller than the diameter of the inner row of bolts 52, 52', it becomes possible to keep tightly jointed the members delimiting the distribution chambers of the fluid under a high pressure in the exchanger according to the invention by means of a number of jointing bolts much greater than the number of the corresponding bolts of the cylindrical exchanger having the same exchange surface. It becomes thereby possible to strongly reduce the diameters of these jointing bolts in the case of the exchanger according to the present invention.

One of the chief advantages resulting from the present invention and which, in addition, brings out very clearly its originality, with regard to the previously known embodiments, consists in the possibility of using, for the building of distribution chambers of heat exchangers with annular nests having different total exchange surfaces but intended for fluids under high pressures of the same value, annular plates 5, 6, 7, 8, and jointing bolts 51, 51', 52, 52', having respectively the same thicknesses and the same diameters. It suffices for this to give to the annular nest 3 a mean diameter proportional to the total exchange surface desired, the radial width being chosen at a value independent of said exchange surface; under this condition, the walls of the distribution chambers of the fluid under a high pressure, as they have the same bearing, can have the same thickness, no matter what the diameter of the annular nest may be. In other words, the present invention allows the making of a set of heat exchangers with annular nests having different exchange surfaces for fluids under the same high pressure, this set being characterized by the fact that the annular plates delimiting the distribution chambers of all the exchangers have the same thickness and the same weight, the annular plates of two exchangers in the set differing only by their inner and outer diameters.

Figure 3:
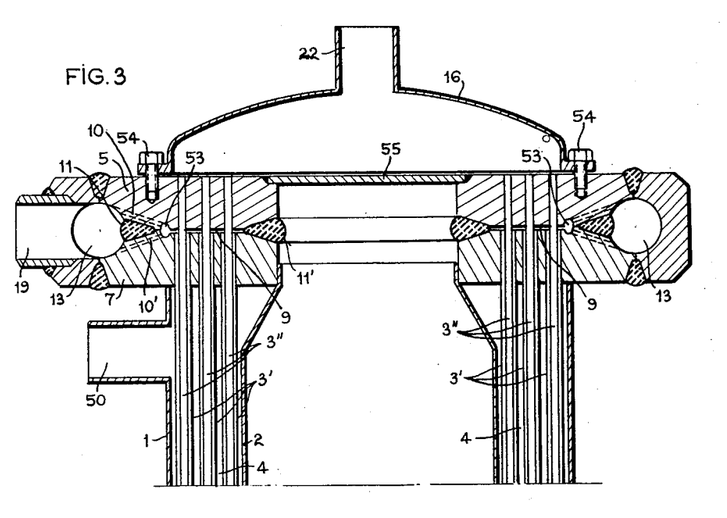
FIGURE 3 shows partly, in axial section, the upper part of a heat exchanger provided with an annular nest of double walled tubes.

In FIGURE 3, is illustrated the axial section of an exchanger according to the invention, provided with an annular nest of double walled tubes.

This exchanger is essentially constituted by a nest of double walled tubes, each formed by two concentric tubes of different diameters 3', 3". The various double walled tubes, 3', 3", of the nest are regularly disposed in an annular chamber delimited by two cylindrical envelopes 1, 2, having different diameters and co-axially disposed to each other. Each end of this annular chamber is tightly closed by an annular thick plate, such as 7, provided with holes into which the corresponding ends of the tubes having the greater diameter 3' are set in a tight way, for instance by expansion or welding. On the outer face of each of the thick annular plates such as 7, is placed another thick annular plate 5, having the same, inner and outer, diameters, and bored with holes in which the corresponding ends of the tubes of small diameters 3" are tightly set, for instance by expansion or welding. One at least of the facing thick annular faces 5 or 7 is provided with a recess to form between the two plates tightened against each other, flat annular chambers such as 9 in which open the corresponding ends of the annular inner channels delimited by the concentric tubes of different diameters 3' and 3". The annular plates 5 and 7 are assembled together to secure the tightness of these annular chambers such as 9, with regard to the outside. In the embodiment shown, this tight connection is obtained by means of weldings such as 11, 11', but it could also be made, of course, by means of tightening bolts and toroidal joints inserted between the annular plates, as in the embodiment with a nest of single walled tubes illustrated in FIGURE 1. A channel, such as 53, is provided on the outer periphery of each of the flat annular chambers, such as 9. The channel 53 is also annular and communicates with the corresponding chamber. In the outer periphery of the thick plates such as 5 and 7, is incorporated a circular manifold, such as 13, provided with a side connecting pipe such as 19 and connected with the annular channel such as 53 by radial channels such as 10, 10', shown in broken lines, in FIGURE 3. On the outer face of each of the thick annular plates such as 5, is fixed by tightening bolts 54 or, eventually by weldings such as 11, 11', a bottom 19, having for instance a semi-spherical shape made of a thin sheet-iron which delimits, with the thick plate 5 and a circular plate 55 obturating its central opening, a manifold connected with the outside by a pipe such as 22. The lower part of this exchanger which has not been illustrated, is absolutely identical to the upper part, above described.

The mode of utilization of this exchanger provided with a nest of double walled tubes is as follows:

The fluid under low pressure is simultaneously introduced into the exchanger through the two pipes such as 50 and 22 at the same end of the apparatus; the fluid under a high pressure is introduced into one of the manifolds such as 13 by the corresponding connecting pipe, such as 19 and flows through the radial channels such as 10, 10', into the annular channel such as 53: when it has arrived in the corresponding flat distribution chamber, for instance 9, the fluid under high pressure flows in the inner annular channels of each double wall tube of the nest, that is to say in each of the annular intervals provided between the two concentric and with different diameters tubes 3', 3". After flowing through the entire length of these annular channels, the fluid under high pressure reaches the opposed annular distribution chamber and the corresponding annular channel from where it is discharged through the radial channels into the exhaust manifold and its connecting pipe. At the same time, the fluid under low pressure, introduced into the annular chamber 4 through the pipe such as 50, circulates in said chamber in the intervals between the tubes 3'; the fluid under low pressure, introduced into the manifold such as 16 by the pipe 22 flows in the inner channels of the tubes of smaller diameter 3', in which it circulates up to their opposed ends and reaches the corresponding manifold from where it is discharged by a pipe homologous to 22. The fluid under low pressure thus circulates simultaneously in two independent exchange circuits, the one constituted by the intervals between the tubes of the annular nest, in the annular chamber in which this nest is disposed, the other circuit being constituted by the inner channels of the double walled tubes of this nest. Of course, the principle of counterflow can also be applied to this embodiment.

The embodiment of the very flat annular distribution chambers illustrated in FIGURE 3 of the annexed drawing is specially suitable in the case of fluids under high pressure in the gaseous state (synthesis of ammonia).

Figure 4:
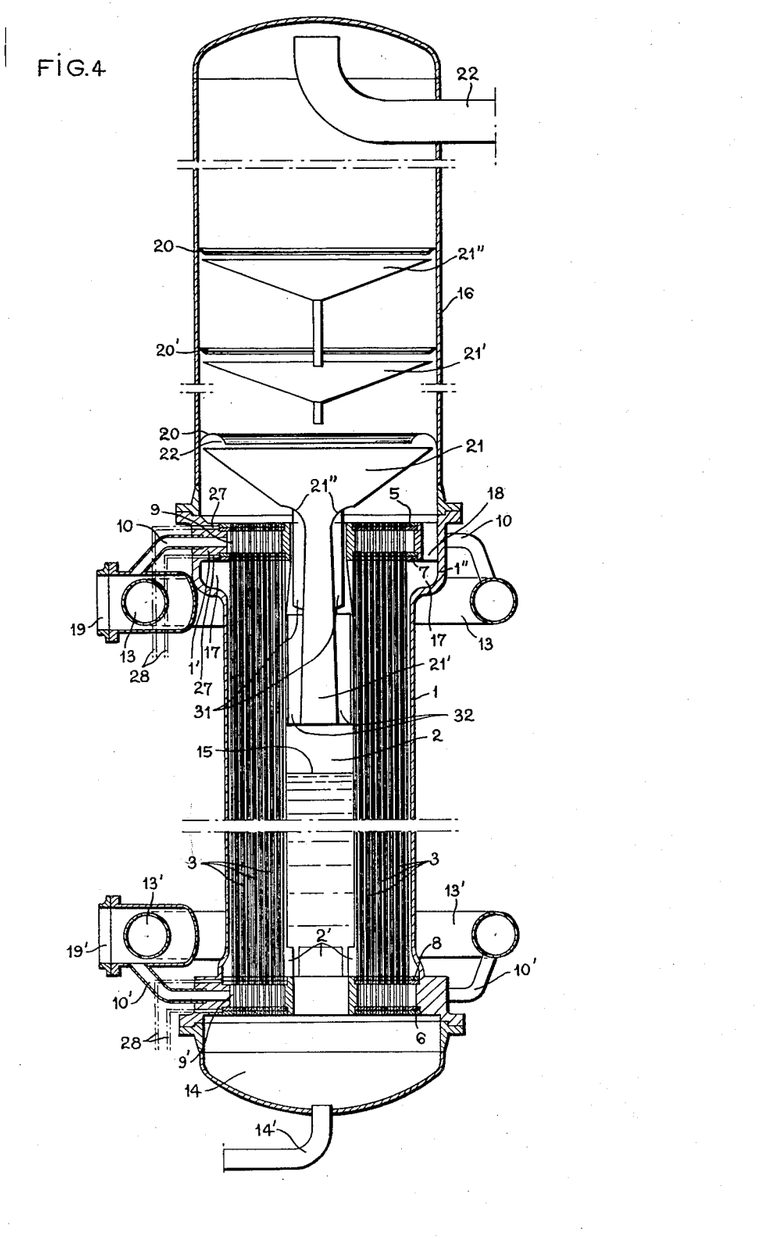
FIGURE 4 shows in axial section a boiler equipped with an annular nest of double walled tubes.

The boiler illustrated in FIGURE 4 is essentially constituted by a metallic cylindrical envelope, having a small thickness, disposed vertically, along the axis of which is mounted a hollow column 2 having the same height. A nest of vertical double walled tubes 3 is regularly distributed in the annular space between the envelope 1 and the column 2, intervals 4, particularly shown in FIGURE 5, being provided between the tubes 3 and also between the envelope 1 and the tubes 3 disposed at the periphery of the annular nest.

Figure 5:
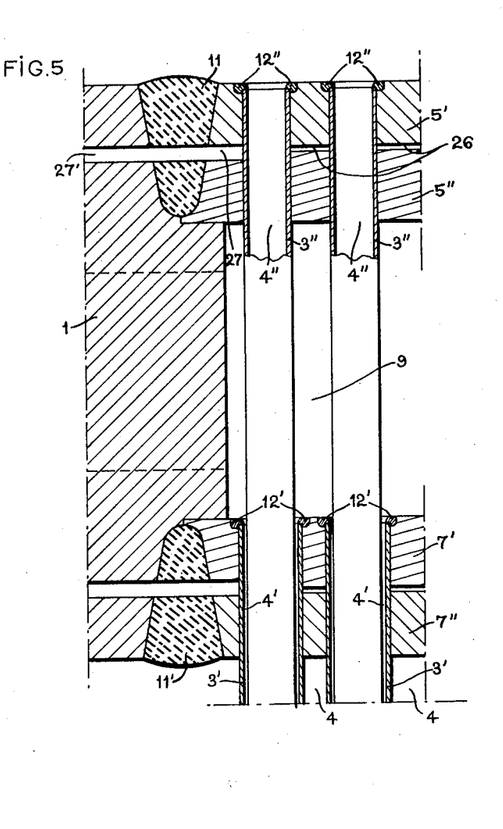
FIGURE 5 is a vertical section of a part of the chamber into which open the upper ends of the annular channels of the double walled tubes of the boiler of FIGURE 4.

As seen also in FIGURE 5, each of the double walled tubes is formed by two concentric metallic single walled tubes 3', 3", having slightly different diameters between which is provided an annular channel 4' having a small radial width.

The upper and lower ends of each tube of smaller diameter 3" are respectively set in holes provided in two rigid metallic plates 5, 6, in which they are expanded, these plates being mounted to obturate the upper and lower ends of the envelope 1. In the same way, the upper and lower ends of each of the tubes 3' of larger diameter are respectively set in holes provided in two other rigid metallic plates 7, 8, in which they are expanded and which are mounted in the envelope 1, at a small distance under and above the plates 5, 6, respectively, to provide two flat chambers 9, 9', having a small height, into each of which opens the homologous ends of the annular channels 4' and which are crossed through by the tubes 3" of smaller diameter.

The rims of the rigid plates 5, 6, 7, 8, are strongly and tightly connected with the envelope 1, for instance by welding seams 11, 11' (FIGURE 5). Other welding seams 12', 12"" disposed on the lips of the extreme openings of the tubes 3', 3", secure the tightness of their expansions in the plates 5, 6, 7, 8. Radial connecting pipes 10, 10' (FIGURE 4) pass, at regular intervals, through the upper wall 1' of the envelope 1, to open respectively in the flat chambers 9 and 9' and connect said chambers with the two independent circular manifolds 13, 13'. Under the cylindrical envelope 1 is fixed a closed tank 14, in the upper end of which the lower ends of the column 2 and the tubes of smaller diameter 3" open directly, through corresponding holes in the rigid plate 6; a connecting pipe 14' opens in the bottom of the tank 14. On the other hand, the base of the column 2 is not solid with the lower plates 6 and 8 and communicates with the inside of the envelope 1 through large apertures 2', provided in its side wall slightly above the rigid plate 8.

On the upper end of the envelope 1 is placed a dome 16 having about the same diameter, in which the upper ends of the column 2 and of the tubes of smaller diameter 3" open directly through corresponding holes in the rigid plate 5. The upper part 1" of the envelope 1 has an inner diameter larger than the outer diameter of the bundle 3 to provide between the rigid plate 7 an annular space 17 which communicates with the inside of the dome 16 by vertical channels 18 having a suitable section, for instance substantially oval shaped, which pass through the upper wall 1' of the envelope 1 at the periphery of the chamber 9, between the radial pipes 10 connecting this chamber with the manifold 13.

The boiler above described works as follows:

The liquid to be vaporized, for instance cleansed plain water is sent through the pipe 14' into the tank 14, from where it flows at the same time into the lower ends of the inner channels 4" of the tubes of smaller diameter 3" and into the end of the column 2, in which it flows up to a given level designated by 15. The liquid flows also through the apertures 2' at the basis of column 2, inside the envelope 1 and bathes the outer walls of the tubes of larger diameter 3'.

Simultaneously, the fluid under a high pressure, heavy water for instance, which arrives at the high temperature of the cooling circuit of the nuclear reactor, is introduced by the connecting pipe 19 or 19', into the upper manifold 13 (or lower manifold 13'); the fluid flows through the radial pipes 10 or 10' into the chamber 9 or 9' and into the annular channels 4' of the double walled tubes 3, that is to say in the intervals provided between the concentric tubes 3, and 3": by flowing through these channels from top to bottom, or possibly from bottom to top, the fluid under high pressure is cooled by a strong heat exchange, through the two thin walls of the tubes 3', 3", with the liquid to be vaporized which ascends in the inner channels 4" of the tubes 3" and in the intervals 4 between the tubes 3'. When it has arrived at the opposed ends of said annular channels 4', the fluid under high pressure accumulates in the chamber 9 or 9', from where the connecting pipe, 10 or 10′, leads it into the manifold 13′ or 13, from where the connecting pipe 19′ or 19 brings it back to the nuclear source, to be reheated. As the liquid to be vaporized ascends in the inner channels 4″ of the tubes 3″ and in the intervals between the tubes 3′, its temperature rises progressively to pass beyond the vaporization temperature: vapor bubbles are formed and their number increases towards the upper end of the boiler: an emulsion of liquid and vapor flows away in the dome 16 where the separation takes place: the liquid falls in the column 2, the vapor escapes towards the upper part of the dome 16 where means are disposed to separate the primed water. These means can be of any known type. An embodiment is illustrated in FIGURE 4. This separator, several stages of which can be superposed in the dome 16, is constituted by a peripheral gutter 20 and a funnel 21, disposed so that a narrow annular opening 22 is formed between their free edges. The damp vapor, flowing out of the tubes 3″ and the pipes 18 under the funnel 21, undergoes, when passing through this narrow opening, a strong expansion which facilitates the fall of the droplets of liquid in the funnel 21 which leads them into the column 2, whereas the vapor ascends in the dome 16. It is possible to superpose in this dome 16 a sufficient number of these separator stages to collect at the upper part of the dome 16, through the pipe 22, a relatively dry vapor, the degree of humidity being, for example, smaller than 0.1%: the drying of the vapor can again be improved by placing a wire gauze having very small meshes above the upper separator stage.

Since the greater part of the not vaporized liquid turns back at the upper part of the boiler into the column 2, it can be admitted that, in permanent running, the liquid to be vaporized circulates actively in a closed circuit in which part of it is continuously taken away for the formation of the vapor: nevertheless, as the output of the connecting pipe 14′ in the tank 14 tends to make up for this loss, the liquid flows in the column 2 up to a level 15 determined by the hydrostatic balance with the liquid flowing up in the inner channels 4″ of the tubes 3″ and in the intervals 4 between the tubes 3′. The upper parts of these two last masses of liquid are in fact emulsions of vapor and water.

Known means, not illustrated in FIGURE 4, are provided to regulate the output of the feed pipe 14′ and maintain at a constant height the level 15 of the liquid in the column 2: the height of their constant level determines the circulation speed of the liquid in the channels 4″ and between the tubes 3′ and thereby its modification makes it possible to act upon the activity of the heat exchange through the walls of the tubes 3′ and 3″ and to adjust the working conditions securing the greatest efficiency for the boiler.

The activity of the evaporation of the boiler can be characterized by the ratio of the output by weight of the fluid to be vaporized circulating in closed circuit in permanent state to the output by weight of the same fluid brought through the pipe 14′ or to the output by weight of the dry vapor escaping through the pipe 22, which is equal to the former. This ratio, technically known as "recycling" or "number of circulations," can reach very high values, comprised, for example, between 15 and 30 in the boiler according to the invention.

Figure 6:
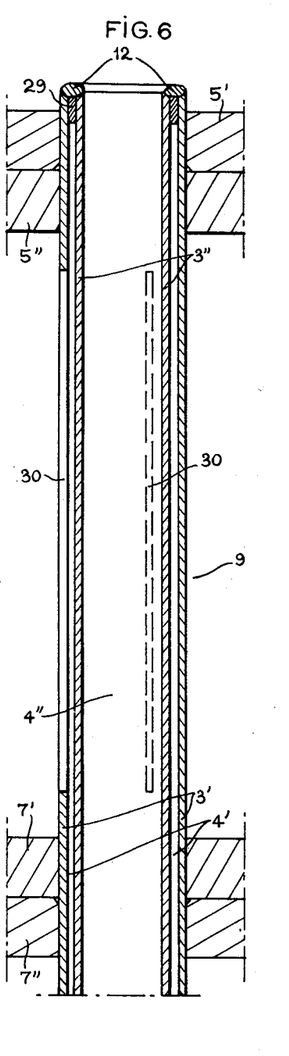
FIGURE 6 illustrates another form of embodiment of the boiler of FIGURE 4.

In FIGURE 6 is illustrated another embodiment of the ends of the double walled tubes 3 passing through the flat chambers 9, 9′. In the present case, the two concentric tubes have the same length: the tube having the greater diameter, 3′ is again expanded or hard soldered in an oven in the rigid plate 7 limiting the chamber 9 at its under side, but its upper end is also expanded in the upper rigid plate 5: the tube of smaller diameter 3″ is fixed inside the tube 3′ by rings 29, respectively disposed between the upper and lower ends of said tubes to give to the annular channel 4 delimited by them a uniform radial width and to obturate the ends of said channel: the channel communicates with the inside of the chamber 9 through apertures in the wall of the tube 3′ at the level of said chamber, for example, longitudinal slits 30. A welding string or a brazing 12 fixes the two ends of the concentric tubes 3′, 3″ and secures the tightness of their annular channel 4′.

This embodiment is particularly interesting in that the fluid passing through the chambers 9, 9′, is under a high pressure and thereby applies important stresses on the rigid plates 5, 6, 7, 8; the tubes 3′ of greater diameter act in such a case as struts between the plates 5 and 7 delimiting the chamber 9 and between the plates 6 and 8 delimiting the chamber 9′.

FIGURE 6 shows in addition that the upper ends of the tubes 3′, 3″, project slightly above the plate 5 constituting the floor of the separating chamber 16: as the not vaporized liquid escaping from 4″, falls on said plate and flows towards the upper opening of the vertical column 2, this arrangement facilitates the release of the bubbles of steam, which have a greater ascending speed than the emulsified water and escape towards the upper part of the chamber 16.

As shown in FIGURE 4, the funnel 21 of the lower deflector of the separating chamber has a shape suitable to facilitate the return into the column 2 of the not vaporized liquid: the outflow tube 21′, engages said column and has an upwardly decreasing section to maintain the freely falling liquid against the wall of said tube 21′ and is connected with the collector 21 of the funnel by round surfaces 21″ extending above the upper ends of the tubes 3″ which are close to the column 2, to guide towards this column the liquid escaping from said tubes 3″. Moreover, the outer wall of the tube 21′ is provided at its upper end with vertical blades which regularize the downwards flow of the not vaporized liquid, thereby preventing any dragging along of vapor: at its mean portion, the wall is provided with blades 32, bent downwards, for instance of 45°, to impart to the liquid a helical flow in contact with said wall up to the free surface 15.

Figure 7:
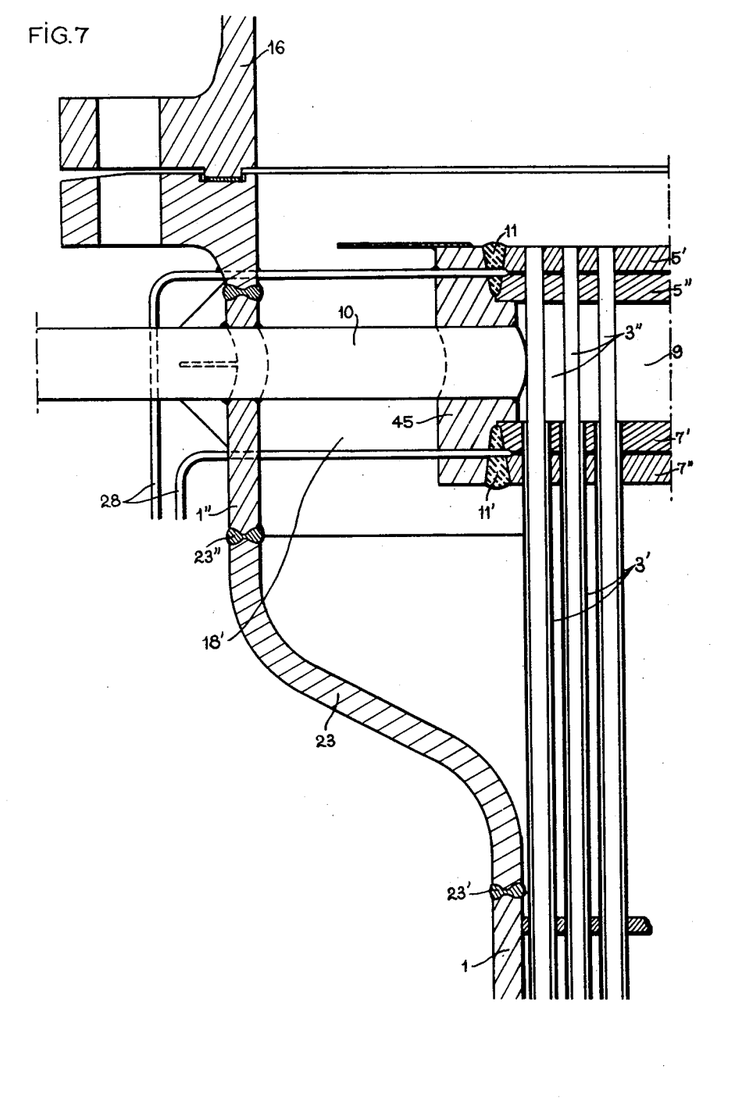
FIGURE 7 shows in axial section, the portion of the envelope of the boiler of FIGURE 4, in which is disposed a sleeve intended to act as an expansion equalizer.

FIGURE 7 shows that the upper portion 1″ of greater diameter of the cylindrical envelope 1 can be connected with the mean portion 1 through a muff or bellows 23, the thin wall of which is made of a steel having a high strength and elastic limit, welded in 23′ to 1 and in 23″ to 1″.

In the event of a sudden variation of the temperature of the fluid under high pressure circulating in the annular channels 4′ of the tubes 3′ and 3″, the length of each of these tubes can vary much quicker than the distance of the rigid plates 5, 7 and 6, 8, in which their ends, upper and lower, respectively, are expanded and welded, as this distance is determined by the height of the cylindrical envelope 1 which is not exposed to the direct heating action of the liquid under high pressure. The setting up between the upper portion 1″ and the mean portion 1 of said envelope of a relatively elastic muff or bellows 23 allows the rigid plates 5, 6, 7, 8, to follow the contractions and expansions of the tubes 3′, 3″ and to prevent the corresponding joints made by expansion and the weldings to be damaged and give rise to leakages.

In the embodiment illustrated in FIGURE 7, the rims of the rigid plates 5 and 7, in which are respectively expanded the upper ends of the tubes 3″ and 3′, are welded in 11, 11′ to a ring 45 which delimits, with said plates 5 and 7, the upper flat chamber 9 and which is independent of the upper portion of larger diameter 1″, of the envelope 1. In this embodiment, the communication between the upper end of the envelope 1 and the base of the dome 16 is not secured by vertical ducts 18 as in FIGURE 4 but by the annular interval 18′ provided between said ring 45 and the side wall of 1″ and which is crossed through by the radial pipes 10 connecting the chamber 9 with the upper collector 13.

This arrangement allows the plates 5, 7 and the ring 45 to follow the expansions of the tubes 3', 3", independently of the expansions of the envelope 1.

In this case also, the base of vertical column 2 is preferably kept independent from the rigid plates 6 and 8, in which are respectively expanded the lower ends of the tubes 3" and 3'.

In another embodiment, the muff or bellows 23 connecting 1 and 1" is not elastic and the radial tubes 10 are in this case preferably elastically distorable and constituted for instance by tubes provided with bellows to be able to stand the expansion variations of the tubes 3', 3" and of the envelope 1.

Figure 8:
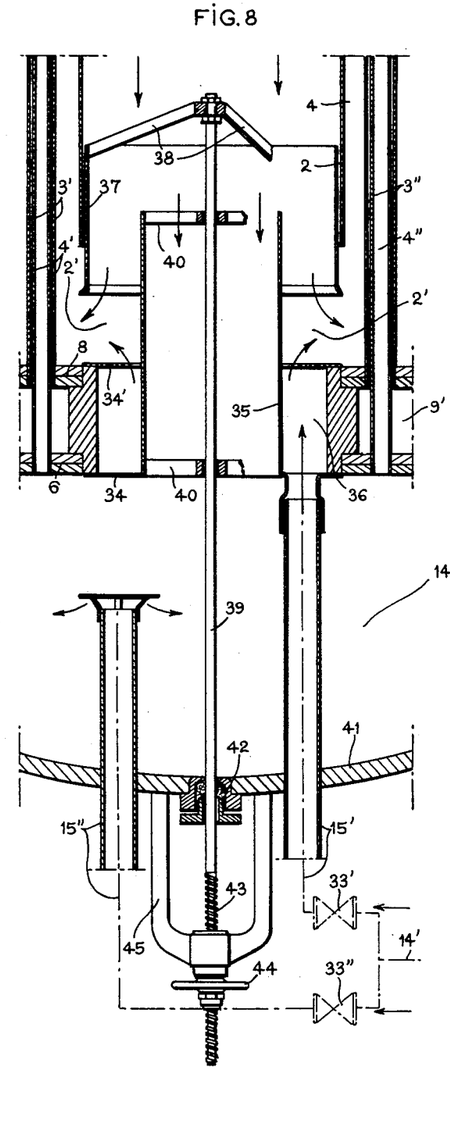
FIGURE 8 shows in longitudinal section the lower axial part of an improved form of embodiment of the boiler according to the invention.

In the embodiment illustrated in FIGURE 8, the lower end of the boiler is fed with the liquid to be vaporized through two independent pipes 15' and 15", similar to the single pipe 14' and each provided with regulation device independent of the output, 33' or 33".

While the pipe 15" opens into the lower tank, like the pipe 14' in the embodiment of FIGURE 4, the pipe 15' opens close to the apertures 2' through which the base of the vertical column 2 feeds the intervals between the tubes 3'.

The base of the column 2 is obturated by a plate 34 through which pass, on the one hand, the mouth of the pipe 15' and, on the other hand, a cylindrical thimble 35, having a smaller diameter than the column 2 and arranged along its axis to open a little above its apertures 2'. A metallic ring, having an inner diameter slightly larger than the diameter of the thimble 35, is arranged round this thimble to form with the plate 34 an annular chamber 36 securing an even distribution of the liquid brought through the pipe 15' on the periphery of the base of the column 2.

Thanks to this arrangement, the hot and not vaporized liquid which has fallen back into the upper end of said column 2, divides at the base of this column into two portions; a portion passes through the thimble 35 in the tank 14 and mixes with the cold liquid to be vaporized flowing through the pipe 15", the mixture at a mean temperature passing then in the circuit of the evaporator formed by the inner channels 4" of the tubes 3", the lower ends of which open in the tank 14; the other portion mixes in the annular space round the thimble 35 with the cold liquid to be vaporized flowing from the chamber 36, the mixture, also at a mean temperature, flowing through the apertures 2' in the second circuit of the evaporator, formed by the intervals 4 between the tubes 3'.

By separately adjusting, by means of the organs 33', 33", the outputs of the pipes 15', 15", it becomes possible to vary the one with respect to other, the mean temperatures of the two mixtures, respectively feeding the two circuits of the evaporator. At the limit, the temperature of the liquid feeding one of these two circuits can be equal to the temperature of the hot not vaporized liquid which has fallen back into the column 2, whereas the temperature of the liquid feeding the other circuit can be equal to the temperature of the cold liquid flowing through the pipes 15' and 15". Another adjustment possibility allows the total output of the circulating liquid to be vaporized and its allotment between the two circuits of the evaporator to be varied. In the case of FIGURE 8, this possibility is given by the thimble 37 which is slidably mounted in the lower end of the column 2 to obturate more or less the aperture 2' through which the second circuit of the evaporator formed by the intervals 4 between the tubes 3' is fed.

In the illustrated example, the thimble 37 is actuated from outside the boiler through the arms 38 and a stem 39 which is guided to slide along the axis of the thimble 35 by arms 40: the lower end of the stem 39, passing through a stuffing box in the bottom 41 of the tank 14 is threaded in 43: a nut, cooperating with the threading 43 but immobilized with respect to the bottom 41 by a stirrup 45, allows, when rotated by means of the operating hand-wheel 44, the stem 39 to slide vertically and thereby the thimble 37. With this adjustment of the useful sections of the apertures 2', the output of the liquid to be vaporized round the tubes 3' can be directly modified.

The device to detect leakages is designed as follows:

Each of the rigid plates 5, 6, 7, 8, in which the ends of the tubes 3', 3", are expanded and welded is formed of two half plates 5', 5" (FIGURE 5), tightened against each other, particularly by the welding strings 11, 11'; at least one of the facing faces of the two half-plates 5', 5", is provided with circular recesses 24 (FIGURE 9) in the edges of the passage holes 25 of the tubes 3' or 3" and with grooves 26 connecting together these recesses 24 and with grooves 27 connecting the recesses with the rim 28 of the plate; when the two complementary half plates, such as 5' and 5", are tightened against each other in the envelope 1, the circular recesses 24, around the expanded ends of the tubes 3', 3", and the grooves 26, 27, form a system of channels isolated from the rest of the boiler and communicating with the outside of the boiler through pipes 27' which lengthen the channels 27 through the envelope 1 (FIGURE 5).

The device works as follows: if the expansion and/or the welding of the end of one of the tubes 3', 3", in the corresponding hole of the rigid plates 5, 6, 7, 8, gives way, an amount of fluid, which can be heavy water or plain water, or mixed with it steam depending upon whether the leakage appears at the level of the half plate 5" or 5', 7" or 7', flows through the joint which is no longer tight, that is between the wall of the damaged tube and the wall of the passage hole 25 of the tube in said plate; the thus filtering fluid reaches the annular recess 24 of the hole 25, from where the channels 26, 27 and 27' lead it to the periphery of the envelope 1. Outer pipes 28 (FIGURE 4) allow the discharge of this fluid sufficiently far away from the boiler to prevent the operator in charge of the detection of leakages from being exposed to the intense radiation of the poisoned fluid passing through the boiler: this arrangement makes it possible not only to immediately know if one of the joints of the tubes 3' or 3" is leaking but also to recover the escaping fluid, and prevent it from flowing into the different parts of the boiler. This is particularly important when the fluid is poisoned and even more when the fluid is heavy water, so costly that its dilution in plain water is to be absolutely prevented.

Of course, the leakage detection channels are not necessarily provided in all the rigid plates 5, 6, 7, 8, but only in the plates in which the expansions and weldings of the tubes 3', 3", are subjected to the highest stresses.

Figure 9:
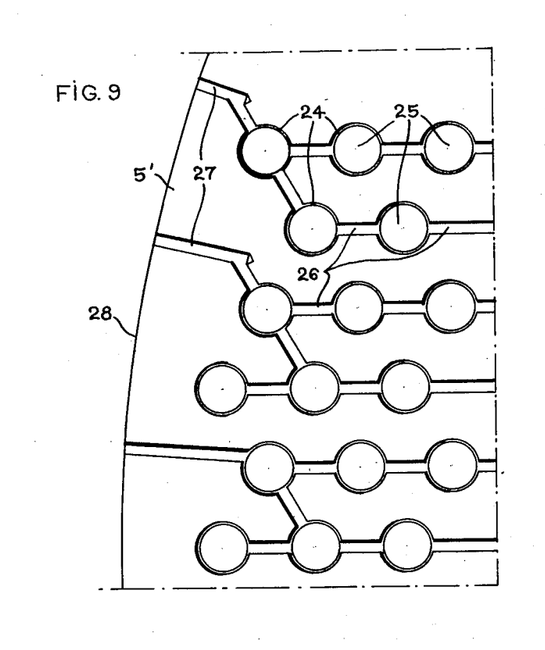
FIGURE 9 shows channels for the detection of the escape of fluid provided in one of the facing faces of the two rigid half-plates tightened against each other which are crossed by the homologous ends of the tubes of the nest of the boiler of FIGURE 4.

In practice, as shown in FIGURE 9, the annular recesses 24 of the passage holes 25 of the same group of adjoining tubes are assembled in parallel series and only the recesses 24, corresponding to the tube of the group the closest of the rim 28 of the plate, is connected with the outside by a discharge channel 27, thus making it possible to locate the group in which has started the leakage. The determination of the tube in the group having the damaged joint can be made, after emptying of the boiler, by the introduction in the corresponding discharge channel of a test fluid under pressure.

What I claim is:

1. A boiler adapted to have circulated through it a hot fluid under a pressure substantially above atmospheric pressure, comprising concentrically-disposed inner and outer thin vertically-elongated envelopes with the walls of said envelopes in radially spaced-apart relationship, and closure means extending between the walls of said envelopes at both ends thereof to define and enclose an annular chamber between said walls, a nest of tubes vertically disposed in said annular chamber, means defining two vertically spaced-apart annular distribution chambers at both ends of said annular chamber, the ends of said tubes of said nest being connected to said distribution chambers, whereby a flow path for the fluid under pressure is formed to extend from one of said distribution chambers through the tubes of said nest to the other of said distribution chambers, inlet pipes for the hot fluid under pressure communicating with one of said distribution chambers, outlet pipes for the removal of said fluid from the other of said distribution chambers, means for maintaining the liquid to be vaporized at a constant level within the inner envelope, means defining input passages at the base of said inner envelope to provide communication between the interior of said inner envelope and said annular chamber, means defining peripherally disposed output passages at the upper end of said annular chamber, whereby the liquid to be vaporized contained in the inner envelope is free to flow therefrom through said input passages into the annular chamber, and to flow in an upward direction towards said peripherally disposed output passages, while sweeping obliquely the nest of tubes disposed in said annular chamber and having the fluid under pressure flowing through them, whereby a strong heat exchange results which brings the temperature of said liquid to its boiling point, and separating means at the upper end of said annular chamber to separate the liquid mixed with the vapor discharged through the output passages, and to return said liquid in the upper end of the inner envelope.

2. A boiler as defined in claim 1, wherein each of the tubes of the nest is formed with a double-wall to form a central channel and a peripheral annular channel, with the ends of the annular channel of each tube opening into said distribution chambers and the central channel of each tube extending through said closure means, said boiler further comprising means to deliver a part of the liquid to be vaporized which is contained in the inner envelope into the lower ends of said central channels of said double-walled tubes, said separating means being disposed to separate the liquid mixed with the vapor reaching the upper ends of said central channels of the tubes and to return said liquid to the upper end of said inner envelope.

3. A boiler as defined in claim 1, wherein the means defining each distribution chamber for the fluid under pressure comprises two spaced-apart plates having bores therein in which are tightly engaged the ends of the tubes of the nest, the inner walls of said bores being provided with annular recesses connected together and with the outside by means of channels to permit detection of leaks of the fluid under pressure and to recover leaked fluid.

4. A boiler as defined in claim 3, wherein each of said plates defining the distribution chambers for the fluid under pressure is formed from two half-plates tightly bound against each other, and said annular recesses and channels for detection and recovery of leaks of said fluid being defined by grooves formed in at least one of the opposed faces of said half-plates.

5. A boiler adapted to have circulated through it a hot fluid under a pressure substantially above atmospheric pressure, comprising concentrically-disposed inner and outer thin vertically-elongated envelopes with the walls of said envelopes in radially spaced-apart relationship, and closure means extending between the walls of said envelopes at both ends thereof to define and enclose an annular chamber between said walls, a nest of tubes vertically disposed in said annular chamber, means defining two vertically spaced-apart annular distribution chambers at both ends of said annular chamber, each of said tubes being formed with a double-wall to form a central channel and a peripheral annular channel, with the ends of the annular channel of each tube opening into said distribution chambers and the central channel of each tube extending through said closure means, whereby a flow path for the fluid under pressure is formed to extend from one of said distribution chambers through said annular channels of the tubes of said nest to the other of said distribution chambers, inlet pipes for the hot fluid under pressure communicating with one of said distribution chambers, outlet pipes for the removal of said fluid from the other of said distribution chambers, means for maintaining the liquid to be vaporized at a constant level within the inner envelope, means defining a closed tank communicating with the lower end of said inner envelope and with the lower ends of said central channels of said double-walled tubes of the nest, whereby said liquid to be vaporized contained in said inner envelope is free to flow into said tank and to rise through the central channels of said double-walled tubes, means defining input passages at the base of said inner envelope to provide communication between the interior of said inner envelope and said annular chamber, means defining peripherally disposed output passages at the upper end of said annular chamber, whereby the liquid to be vaporized contained in the inner envelope is free to flow therefrom through said input passages into the annular chamber, and to flow in an upward direction towards said peripherally disposed output passages, while sweeping obliquely the nest of tubes disposed in said annular chamber and having the fluid under pressure flowing through them, whereby a strong heat exchange results which brings the temperature of said liquid to its boiling point, a dome mounted above the upper distribution chamber with the output passages at the upper end of the annular chamber and the upper ends of the central channels of the double-walled tubes opening into said dome, a plurality of superposed members in said dome adapted to separate the liquid mixed with the vapor escaping from said output passages and from the upper ends of the central channels of the double-walled tubes, and to return said liquid into the upper end of the inner envelope, each of said separating members being defined by a funnel disposed above the inner envelope and a circular gutter forming with the upper rim of said funnel a narrow annular passage, whereby dry vapor will flow from the upper part of said dome.

6. A boiler as defined in claim 5, wherein said output passages are defined by vertical pipes mounted to connect the upper end of the annular chamber with the separating dome, two manifolds respectively surrounding the annular distribution chambers of the fluid under pressure, and horizontal pipes disposed between said vertical pipes and mounted to connect each distribution chamber with the adjacent manifold.

7. A boiler as defined in claim 6, wherein the upper end of the outer envelope is independent of the upper distribution chamber, and the lower end of the inner envelope is independent of lower distribution chamber, the horizontal pipes connecting said upper distribution chamber with the adjacent manifold being elastically distortable.

8. A boiler as defined in claim 5, wherein the upper end of the outer envelope is connected with the outer side wall of the upper distribution chamber by means of an expansion muff made of a resilient metal, and the lower end of the inner envelope is independent of the lower distribution chamber.

9. A boiler as defined in claim 5, wherein the funnel of the lowermost separating member is provided with a discharge pipe having a downwardly increasing section and connected at its upper end with said funnel by means of rounded surfaces, and the part of said discharge pipe extending into the upper end of the inner envelope being provided on its outer surface with two vertically spaced-apart sets of guiding blades for the liquid, the blades of the upper set being vertical and the blades of the lower set being oblique.

10. A boiler as defined in claim 5, further adapted to have means for adjusting the area of said input passages from the outside of said boiler.

11. A boiler according to claim 5, including a thimble slidably mounted so as to adjust the area of the input passages provided at the base of the inner envelope, and a driving apparatus of the screw and nut type for said thimble arranged so that said thimble is operatable thereby from outside said boiler.

12. A boiler according to claim 11, further comprising a fixed thimble of a smaller size than the slidably mounted thimble and disposed so as to connect the lower closed tank with the portion of the inner envelope located above the input passages provided at its base, two admission pipes for the liquid to be vaporized, one of said admission pipes opening into said closed tank and the other of said admission pipes opening in the interval between said fixed smaller-sized thimble and the base of said inner envelope, and means for separately adjusting the output of said two admission pipes.

References Cited in the file of this patent
UNITED STATES PATENTS

| | | |
|---|---|---|
| 826,773 | Engleitner | July 24, 1906 |
| 898,147 | Von Seemen | Sept. 8, 1908 |
| 1,326,277 | Latourelle | Dec. 30, 1919 |
| 2,070,223 | Butler | Feb. 9, 1937 |
| 2,862,479 | Blaser et al. | Dec. 2, 1958 |